United States Patent
Xhafa et al.

(10) Patent No.: US 12,252,035 B2
(45) Date of Patent: Mar. 18, 2025

(54) DETERMINING SUPER FRAME PACKET GENERATION TIMES

(71) Applicant: TEXAS INSTRUMENTS INCORPORATED, Dallas, TX (US)

(72) Inventors: Ariton E. Xhafa, Plano, TX (US); Ramanuja Vedantham, Frisco, TX (US); Jesus Daniel Torres Bardales, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 642 days.

(21) Appl. No.: 17/461,834

(22) Filed: Aug. 30, 2021

(65) Prior Publication Data
US 2023/0063402 A1 Mar. 2, 2023

(51) Int. Cl.
*B60L 58/22* (2019.01)
*B60L 50/60* (2019.01)
*B60R 16/033* (2006.01)
*H01M 10/44* (2006.01)

(52) U.S. Cl.
CPC .......... *B60L 58/22* (2019.02); *B60L 50/66* (2019.02); *B60R 16/033* (2013.01); *H01M 10/441* (2013.01); *H01M 2220/20* (2013.01)

(58) Field of Classification Search
CPC ........ B60L 58/22; B60L 50/66; B60R 16/033; H01M 10/441; H01M 2220/20
USPC .......................................................... 702/63
See application file for complete search history.

(56) References Cited

U.S. PATENT DOCUMENTS

| | | | |
|---|---|---|---|
| 9,293,935 B2 | 3/2016 | Lee | |
| 10,703,211 B2 | 7/2020 | Chuang | |
| 11,038,216 B2 | 6/2021 | Kwon | |
| 11,483,824 B2 | 10/2022 | Lee | |
| 2008/0159355 A1 | 7/2008 | Rengert | |
| 2011/0150042 A1 | 6/2011 | Liu | |
| 2015/0382171 A1* | 12/2015 | Roy | H04Q 3/08 370/329 |
| 2016/0218866 A1 | 7/2016 | Patil et al. | |

(Continued)

OTHER PUBLICATIONS

Anwar, IEEE 802.15.4E LLDN: Superframe Configuration for Networked Control System (Year: 2014).*

(Continued)

*Primary Examiner* — Mohamed Charioui
*Assistant Examiner* — Dacthang P Ngo
(74) *Attorney, Agent, or Firm* — Carl G. Peterson; Frank D. Cimino

(57) ABSTRACT

In examples, a vehicular battery management system (BMS) comprises a set of battery cells and a secondary network node coupled to the set of battery cells. The secondary network node is configured to measure a parameter in the set of battery cells and generate a packet containing the parameter. The packet indicates a number of super frame slots that have elapsed from a start time of a super frame to the generation of the packet. The secondary network node is configured to wirelessly transmit the packet within the super frame to a primary network node. The primary network node is configured to wirelessly receive the packet and to determine a time at which the secondary network node generated the packet based on the indication, a time duration of each slot in the super frame, and the start time of the super frame.

22 Claims, 10 Drawing Sheets

(56) References Cited

U.S. PATENT DOCUMENTS

| | | | |
|---|---|---|---|
| 2018/0290556 A1* | 10/2018 | Demont | H01M 10/425 |
| 2019/0237816 A1 | 8/2019 | Kim | |
| 2019/0265304 A1 | 8/2019 | Kim | |
| 2019/0273293 A1* | 9/2019 | Kim | H01M 10/63 |
| 2019/0363815 A1 | 11/2019 | Bogenberger | |
| 2020/0396688 A1 | 12/2020 | Hong | |
| 2021/0043983 A1* | 2/2021 | Choi | H01M 10/425 |
| 2021/0045109 A1* | 2/2021 | Lee | H01M 10/425 |
| 2021/0084675 A1 | 3/2021 | Aijaz | |
| 2021/0281988 A1* | 9/2021 | Han | B60L 58/18 |
| 2021/0319877 A1 | 10/2021 | Teng | |
| 2021/0377894 A1 | 12/2021 | Kamath | |
| 2022/0091062 A1 | 3/2022 | Gullapalli | |
| 2022/0113356 A1 | 4/2022 | Kasselman | |
| 2022/0179001 A1* | 6/2022 | Park | G01R 31/36 |
| 2022/0332213 A1 | 10/2022 | Xhafa | |
| 2022/0368364 A1 | 11/2022 | Martinez | |
| 2022/0398256 A1* | 12/2022 | Hartline | G06F 16/2379 |
| 2022/0417792 A1 | 12/2022 | Winder | |

OTHER PUBLICATIONS

Vija, Enabling Robust Wireless Communication for BMS on electric Vehicle (Year: 2021).*

International Standard, ISO 26262-1, "Road vehicles—Functional Safety", International Organization for Standardization, Second Addition, Dec. 2018, 42 pgs.

Xhafa, et al., "Wireless Protocol for Battery Management Systems", Texas Instruments, Jun. 4, 2019, 6 pgs.

Xhafa, et al., U.S. Appl. No. 17/820,441, "Mesh Network During Keep Alive in Wireless Battery Management System", filed Aug. 17, 2022.

Kunduru, et al., United States Patent Application No. 17/823, 138, "Multiple Primary Nodes for Wireless Battery Management System Robustness", filed Aug. 30, 2022.

Texas Instruments. CC2642R SimpleLink(TM) Bluetooth(R) 5.2 Low Energy Wireless MCU. SWRS194H—Jan. 2018—Revised Mar. 2021. 66 pages.

Xhafa, et al., "Enabling Data Integrity in Wireless Devices Connected to Battery Monitor", Texas Instruments, Jun. 4, 2019, 4 pgs.

EM Microelectronic, EM9301 Datasheet, 2018, 51 pages (Year: 2018).

Song et al. "The AES-CMAC Algorithm", National Institute of Standards and Technology (NIST), 2006, "https://www.rfc-editor.org/ rfc/pdfrfc/rfc4493.txt.pdf", 20 pages (Year: 2006).

Nordic semiconductor, nRF25840 Datasheet, 2018, 551 pages (Year: 2018).

* cited by examiner

DETERMINING SUPER FRAME PACKET GENERATION TIMES

CROSS-REFERENCE TO RELATED APPLICATIONS

The present application relates to expired U.S. Provisional Patent Application No. 62/861,759, which was filed Jun. 14, 2019, is titled "Providing Data Latency In Wireless Battery Management Systems," and is hereby incorporated herein by reference in its entirety.

BACKGROUND

Modern vehicles may include multiple battery cells. Information associated with the cells, such as temperature, voltage, and other indicators of cell status and health, may be monitored for vehicular safety and to ensure proper operation.

SUMMARY

In examples, a vehicular battery management system (BMS) comprises a set of battery cells and a secondary network node coupled to the set of battery cells. The secondary network node is configured to measure a parameter in the set of battery cells and generate a packet containing the parameter. The packet indicates a number of super frame slots that have elapsed from a start time of a super frame to the generation of the packet. The secondary network node is configured to wirelessly transmit the packet within the super frame to a primary network node. The primary network node is configured to wirelessly receive the packet and to determine a time at which the secondary network node generated the packet based on the indication, a time duration of each slot in the super frame, and the start time of the super frame.

In examples, a method comprises wirelessly transmitting a first packet in a super frame to a node coupled to a set of battery cells. The method comprises, responsive to the transmission, wirelessly receiving from the node a second packet that indicates a number of super frame slots that have elapsed from a start time of the super frame to a time at which the second packet was generated. The method comprises calculating the time at which the second packet was generated using the start time of the super frame and the number of super frame slots that have elapsed from the start time of the super frame. The method comprises controlling operation of the battery cells based on the calculation.

In examples, a computer-readable medium stores executable code, which, when executed by a controller, causes the controller to receive a packet from a node in a super frame, the packet indicating a number of super frame slots that have elapsed from a start time of the super frame to a time at which the packet was generated. The controller is also caused to determine the time at which the packet was generated by adding a product of the number of super frame slots and a time duration of each of the super frame slots to the start time of the super frame. The controller is also caused to control operation of a battery cell based on the determination.

In examples, a vehicular battery management system (BMS) comprises a set of battery cells and a secondary network node coupled to the set of battery cells. The secondary network node is configured to measure a parameter in the set of battery cells, generate a packet containing the parameter, modify the packet to indicate a number of super frame slots between the generation and a transmission of the packet, and wirelessly transmit the packet within the super frame to a primary network node. The primary network node is configured to wirelessly receive the packet and to determine a time at which the secondary network node generated the packet based on a current time, the indication, and a time duration of each slot in the super frame.

BRIEF DESCRIPTION OF THE DRAWINGS

For a detailed description of various examples, reference will now be made to the accompanying drawings in which.

DETAILED DESCRIPTION

Figure 1:
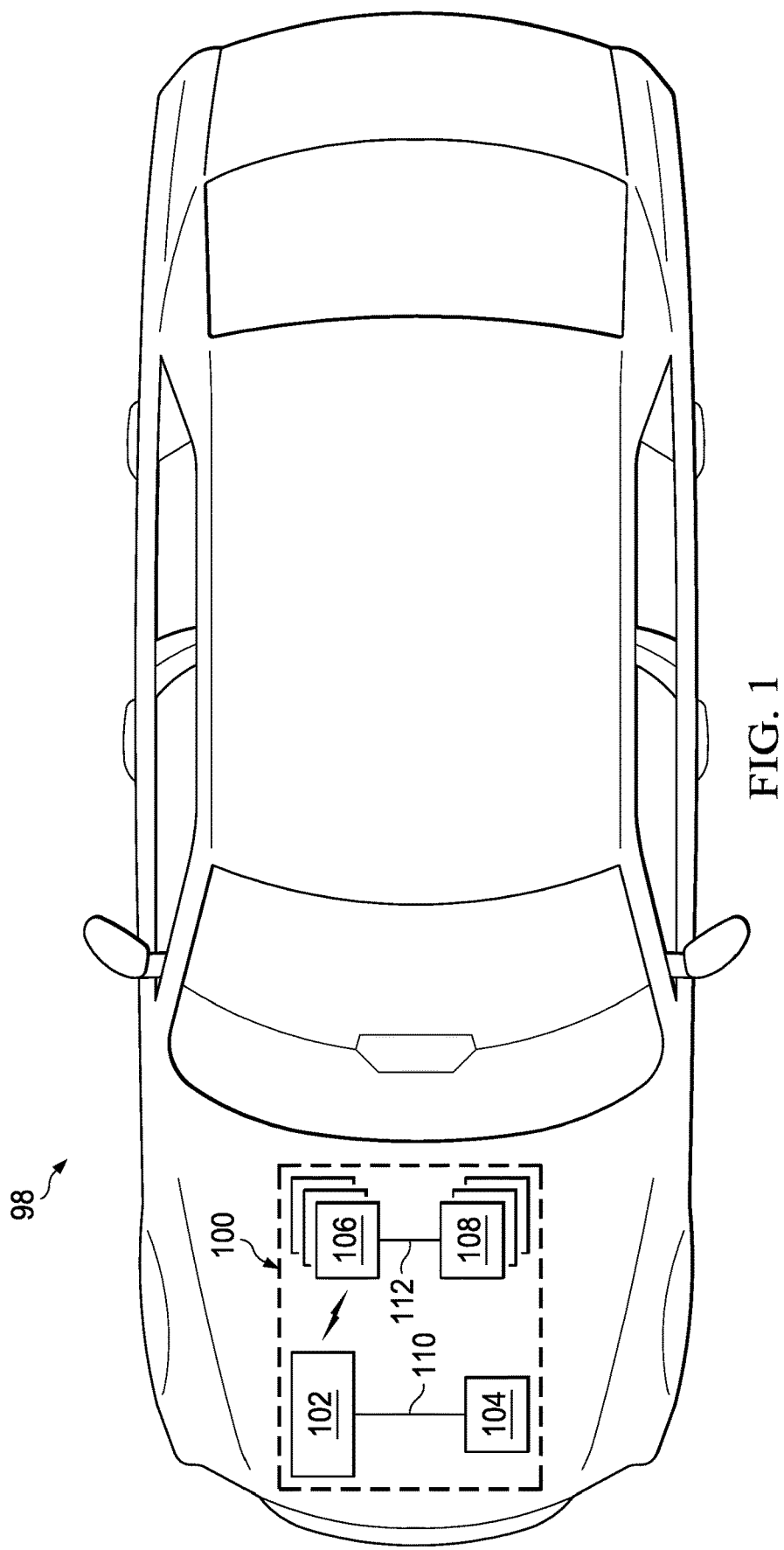
FIG. 1 is a block diagram of a wireless battery management system according to various examples.

Some electronic devices operate using batteries. For example, electric vehicles include multiple battery cells that provide power to those vehicles. Because battery cells in an electronic device can provide large amounts of power, and further because the power provided by the battery cells may be vital to the operation of the electronic device, the electronic device may include a system to manage the battery cells.

Battery management systems (BMSs) may manage the battery cells of an electronic device in various ways. For example, a BMS may monitor the health (e.g., voltage, current, temperature) of battery cells in an electronic device. Further, the BMS may control various battery cells to manage the quantity of power provided by the battery cells and where that power is directed within the electronic device. Generally, a BMS includes multiple components, such as multiple battery modules and a controller to manage the battery modules. Each battery module, in turn, may couple to multiple battery cells and include a battery monitor to monitor those battery cells. Thus, the battery cells coupled to a battery module provide power to the electronic device; the battery monitor in the battery module monitors the health and operation of the battery cells in that battery module; and the controller communicates with the battery monitor to ensure the battery module and its cells are operating properly. The controller may also communicate with the battery monitor to control the operation of the battery cells, such as to turn on, turn off, redirect, or otherwise balance the power provided by those battery cells.

BMSs may incorporate wireless technology. For example, a primary network node contains or is coupled to a controller and a secondary network node contains a battery module that controls multiple battery cells. The primary and secondary network nodes may communicate with each other wirelessly, for example using radio frequencies. In some protocols, a super frame is useful to facilitate wireless communications between the primary and secondary network nodes. In the super frame, the primary network node first broadcasts a downlink communication to the secondary network node (and to any other secondary network nodes in the system). The secondary network nodes individually respond to the primary network node with uplink communications in a serial manner. Because the secondary network node uplink communication responses are transmitted to the primary network node wirelessly, the responses are vulnerable to the disadvantages and challenges associated with wireless communications. For example, a secondary network node's uplink communication response to a primary network node may become delayed or lost, and in some cases, the secondary network node may transmit the response to the primary network node a second time. These errors in wireless communication may negatively impact the operation of the primary network node. For instance, the controller in or coupled to the primary network node may adjust operations of one or more battery modules based on the timing of the responses received from the secondary network nodes. If a secondary network node's response is delayed, lost, re-sent, or otherwise adversely affected, the primary network node may adjust operations of one or more battery modules in an undesirable manner.

Described herein are various examples of a BMS in which a primary network node is configured to use information included in a packet from a secondary network node to determine the time at which the secondary network node generated the packet. The primary network node may then use the determination, alone or in tandem with battery cell parameters in other packets received from other secondary network nodes, to control the BMS (e.g., to perform cell-balancing operations). By using the time at which the secondary network node generated the packet rather than the time at which the primary network node received the packet, the primary network node has a more accurate perception of the behavior of the BMS (e.g., the battery cells being monitored), a perception that is minimally or not affected by the challenges associated with wireless communications (e.g., delayed or lost packets).

For example, a vehicular BMS may include a set of battery cells and a secondary network node coupled to the set of battery cells. The secondary network node may be configured to measure a parameter in the set of battery cells. The secondary network node also may be configured to generate a packet containing the parameter, the packet indicating a number of super frame slots that have elapsed from a start time of a super frame to the generation of the packet. Further, the secondary network node may be configured to wirelessly transmit the packet within the super frame to the primary network node. The BMS also may include a primary network node configured to wirelessly receive the packet and to determine a time at which the secondary network node generated the packet based on the indication, a time duration of each slot in the super frame, and the start time of the super frame. For instance, the primary network node may be configured to determine the time at which the secondary network node generated the packet by adding a product of the indication and the time duration to the start time of the super frame. Based on this determination, the primary network node may control one or more aspects of the BMS. By using the times that secondary network nodes generate packets rather than the times that the primary network node receives packets, the primary network node uses information that more accurately characterizes the behavior of the BMS, thus enhancing the effectiveness with which the primary network node manages the BMS.

FIG. 1 is a top-down view of an example system 98, such as an automotive vehicle, that includes a wireless battery management system (WBMS) 100. In some examples, the system 98 is any system that may include a wireless battery management system to supply power to one or more components of the system 98. As shown, the wireless battery management system 100 includes a primary network node 102, a battery controller 104, a plurality of secondary network nodes 106, and a plurality of battery cells 108. In an example, the wireless battery management system 100 may include a plurality of primary network nodes.

In an example, the primary network node 102 is coupled to the battery controller 104 using a first wired connection 110. In an example, the first wired connection 110 between the primary network node 102 and the battery controller 104 is a universal asynchronous receiver/transmitter (UART), inter-integrated circuit (I2C), or the like. The secondary network nodes 106 are wirelessly coupled to the primary network node 102 and coupled to the battery cells 108 using a second wired connection 112.

In an example, the wireless battery management system 100 provides wireless radio frequency (RF) communication between the primary network node 102 and the secondary network nodes 106. In an example, the wireless RF communication uses the license-free 2.4 gigahertz (GHz) industrial, scientific, and medical (ISM) band from 2.4 GHz to 2.483 GHz, which is compliant with BLUETOOTH special interest group (SIG). In examples, the wireless battery management system 100 uses 2 megabits per second (Mbps) BLUETOOTH low energy (BLE) across the physical layer (PHY). The Open Systems Interconnection (OSI) model includes the PHY as a layer used for communicating raw bits over a physical medium. In this case, the PHY is free space, which the wireless battery management system 100 uses to wirelessly communicate between the primary network node 102 and the secondary network nodes 106. In an example, the transmission power of the wireless battery management system 100 is less than or equal to 10 decibel-milliwatts (dBm).

In an example, the wireless RF communication between the primary network node 102 and the secondary network nodes 106 utilizes frequency hopping and time slotted allocations to transmit and receive data across super frames (SFs). A super frame, also referred to as a super frame interval, is a time interval including time and frequency allocations for data exchanges between the primary network node 102 and the secondary network nodes 106, including interframe spacing between these allocations. Frequency hopping includes transmitting RF signals by rapidly changing the transmission frequency among many distinct frequencies occupying a spectral band. In an example, frequency hopping occurs based on a linear shift-back register and a master identification (ID) of the primary network node 102. The linear shift-back register uses linear bit rotation to indicate a pattern of frequencies on which the primary network node 102 and the secondary network nodes 106 will communicate. Time slotted allocations are time slots that are assigned either to the primary network node 102 or one or more of the secondary network nodes 106 for transmitting to either one or more of the secondary network nodes 106 or the primary network node 102. The time slotted allocations occur in a half-duplex mode, as both the primary network node 102 and the secondary network nodes 106 switch between transmit and receive modes according to the temporal moment specified in scan/pairing frames of exchanged data for downlink (DL)/uplink (UL) durations.

In an example, the wireless battery management system 100 uses frequency division multiple access (FDMA) and changes the frequency at which frames are transmitted between the primary network node 102 and the secondary network nodes 106 to increase robustness against interference. In an example, the wireless battery management system 100 uses frequency hopping tables, black listing of frequencies, and configuration channels to mitigate interference with other wireless networks. Frequency hopping occurs on a per SF basis, where during the SF, time slotted allocations are used for frame exchange. Black listing is suspending the use of frequency channels that may be susceptible to interference. Configuration channels may be used for scanning, pairing, and negotiating communication between the primary network node 102 and the secondary network nodes 106.

In an example, the wireless RF communication between the primary network node 102 and the secondary network nodes 106 uses 40 channels, where a subset of the 40 channels (e.g., channels 37, 38, and 39) is used for system configuration and the remaining 37 channels are used to exchange data. In an example, a single channel may be used as a configuration channel.

In an example, the wireless battery management system 100 supports periodic and a-periodic data exchanges from the secondary network nodes 106 to the primary network node 102 using wireless RF communication. The primary network node 102 and the secondary network nodes 106 use a common data format structure for both periodic and a-periodic data exchanges. Periodic data exchange occurs based on a repetitive interval, while a-periodic data exchange does not occur based on a repetitive interval. The data format is a description of rules that the data populating a file will follow. Generally, the more thorough the description of the data format, the easier it is for validation rules to be written on both the sending and receiving sides of the wireless battery management system 100.

In an example, the primary network node 102 scans the network to obtain a master ID and discover the secondary network nodes 106. The primary network node 102 scans the network by transmitting a management frame to coordinate medium access, wakeup schedules, and clock synchronization within the secondary network nodes 106. The primary network node 102 also uses the management frame to learn about the secondary network nodes 106 in the network. Initially, the primary network node 102 performs a passive scan to obtain (or check for) a master ID value in use by other nodes and/or devices. The primary network node 102 then selects a master ID that is different from the master IDs used by other nodes and/or devices.

In an example, after the primary network node 102 has selected a master ID, the primary network node 102 transmits a scan request frame in every SF period as long as there are unconnected secondary network nodes 106 from the primary network node 102. In an example, the primary network node 102 is programmed with the total number of the secondary network nodes 106 to be connected to the primary network node 102. After all the secondary network nodes 106 are connected and confirmed, the primary network node 102 will not transmit any more scan requests. The scan request frames include information about the structure of the SF and the frame formatting of the DL and UL slots.

For the primary network node 102 to scan for the secondary network nodes 106, the primary network node 102 enters a scan state. In this state, the primary network node 102 transmits a scan request frame in every SF period. The secondary network nodes 106 reply to the primary network node 102 with a scan response and await a pairing request frame from the primary network node 102. After the secondary network nodes 106 receive the pairing request, the secondary network nodes 106 respond within the same SF in the frequency slot assigned by the primary network node 102. In examples, this exchange occurs in the configuration channels. No data exchanges occur in this state.

In an example, transmission cycles or SFs depend on the number of secondary network nodes 106 and/or battery cells 108 in the network. The primary network node 102 determines the SF interval based on the number of secondary network nodes 106. Given a number of secondary network nodes 106, the primary network node 102 estimates the number of DL slots usable to transmit the packets to the secondary network nodes 106. Accordingly, the total number of slots in the communication time interval becomes the following:

$$\text{Total\_slots} = nr\_of\_WD + nr\_DL\_slots,$$

where nr_of_WD is the number of secondary network devices and nr_DL_slots is the number of DL slots available to the secondary network devices.

The wireless battery management system 100 manages the battery cells 108 using the primary network node 102, the battery controller 104, and the secondary network nodes 106. The primary network node 102 and the secondary network nodes 106 communicate with each other about the state of the battery cells 108. The primary network node 102 and the secondary network nodes 106 may communicate with each other using various protocol formats. For example, the primary network node 102 and the secondary network nodes 106 use a DL protocol format and a UL protocol format, where each of the DL protocol format and the UL protocol format includes a frame control field to communicate battery management information. When the battery cells 108 notify the secondary network nodes 106 of a condition, the secondary network nodes 106 communicate to the primary network node 102 that the condition is present. The primary network node 102 receives the notification of the condition from the secondary network nodes 106 and alerts the battery controller 104 of the condition. The battery controller 104 determines a proper reaction to the condition and sends an instruction to the primary network node 102. The primary network node 102 transmits the instruction to the secondary network nodes 106. The secondary network nodes 106 receive the instruction to manage the battery cells 108 in response to the condition. The secondary network nodes 106 manage the battery cells 108 in response to the condition.

Figure 2A:
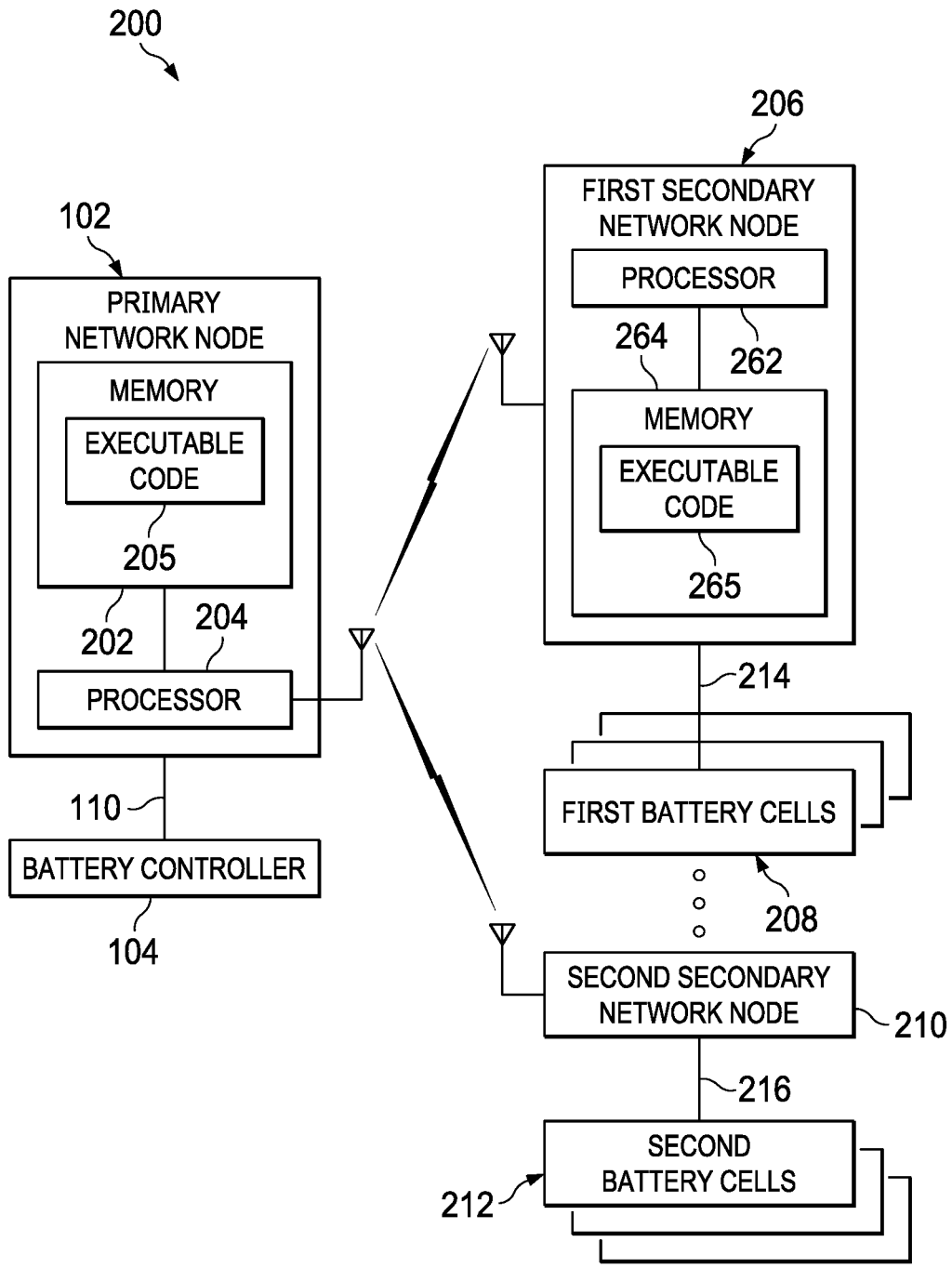
FIG. 2A is a block diagram of a wireless battery management system according to various examples.

FIG. 2A illustrates an example wireless battery management system 200. The wireless battery management system 200 is an example of the wireless battery management system 100 described above. As shown, the wireless battery management system 200 includes the primary network node 102, the battery controller 104, a memory 202, a processor 204, a first secondary network node 206, a first plurality of battery cells 208, a second secondary network node 210, and a second plurality of battery cells 212. Additional secondary network nodes 206, 210 may be included, although they are not expressly shown. The primary network node 102 includes the memory 202 and the processor 204 that is configured to execute code 205 stored on the memory 202 to perform one or more of the actions attributed herein to the primary network node 102. In an example, a portion of the memory 202 may be non-transitory and a portion of the memory 202 may be transitory. The secondary network nodes 206, 210 also may include processors and memory. For example, as shown, the secondary network node 206 includes a processor 262 coupled to a memory 264 storing code 265 that is executable by the processor 262 to perform one or more of the actions attributed herein to the secondary network node 206.

The primary network node 102 is coupled to the battery controller 104 using the first wired connection 110 and is wirelessly coupled to each of the secondary network nodes 206, 210. The first secondary network node 206 is coupled to the first plurality of battery cells 208 using a third wired connection 214 and wirelessly coupled to the primary network node 102. The second secondary network node 210 is coupled to the second plurality of battery cells 212 using a fourth wired connection 216 and wirelessly coupled to the primary network node 102. FIG. 2A does not limit the number of secondary network nodes in the wireless battery management system 200; rather, the naming convention indicates that each of the secondary network nodes is coupled to a plurality of battery cells.

In an example, the primary network node 102 is wirelessly coupled to at least eight secondary network nodes 206, 210. In an example, each of the secondary network nodes 206, 210 can be coupled to at least 16 battery cells using a wired connection. In examples, the wireless battery management system 200 includes one primary network node. In other examples, the wireless battery management system 200 includes multiple primary network nodes.

The wireless battery management system 200 manages the first plurality of battery cells 208 and the second plurality of battery cells 212 using the primary network node 102, the battery controller 104, the memory 202, the processor 204, the first secondary network node 206, and the second secondary network node 210. Instructions in the memory 202 cause the processor 204 to instruct the primary network node 102 to wirelessly communicate with the first secondary network node 206 and the second secondary network node 210 about the state of the first plurality of battery cells 208 and the second plurality of battery cells 212. The primary network node 102 and the secondary network nodes 206, 210 communicate using various protocol formats. For example, the primary network node 102 and the secondary network nodes 206, 210 use a DL protocol format and a UL protocol format, where each of the DL protocol format and the UL protocol format includes a frame control field to communicate battery management information. When the first plurality of battery cells 208 notify the first secondary network node 206 of a condition, the first secondary network node 206 communicates with the primary network node 102 that the condition is present. The primary network node 102 receives the notification of the condition from the first secondary network node 206 and alerts the battery controller 104 of the condition. The battery controller 104 determines a proper reaction to the condition and sends an instruction to the primary network node 102. The primary network node 102 transmits the instruction to the first secondary network node 206. The first secondary network node 206 receives the instruction to manage the first plurality of battery cells 208 in response to the condition of the first plurality of battery cells 208. The first secondary network node 206 manages the first plurality of battery cells 208 in response to the condition. A similar process may apply to the second secondary network node 210 when a condition is present in the second plurality of battery cells 212.

Figure 2B:
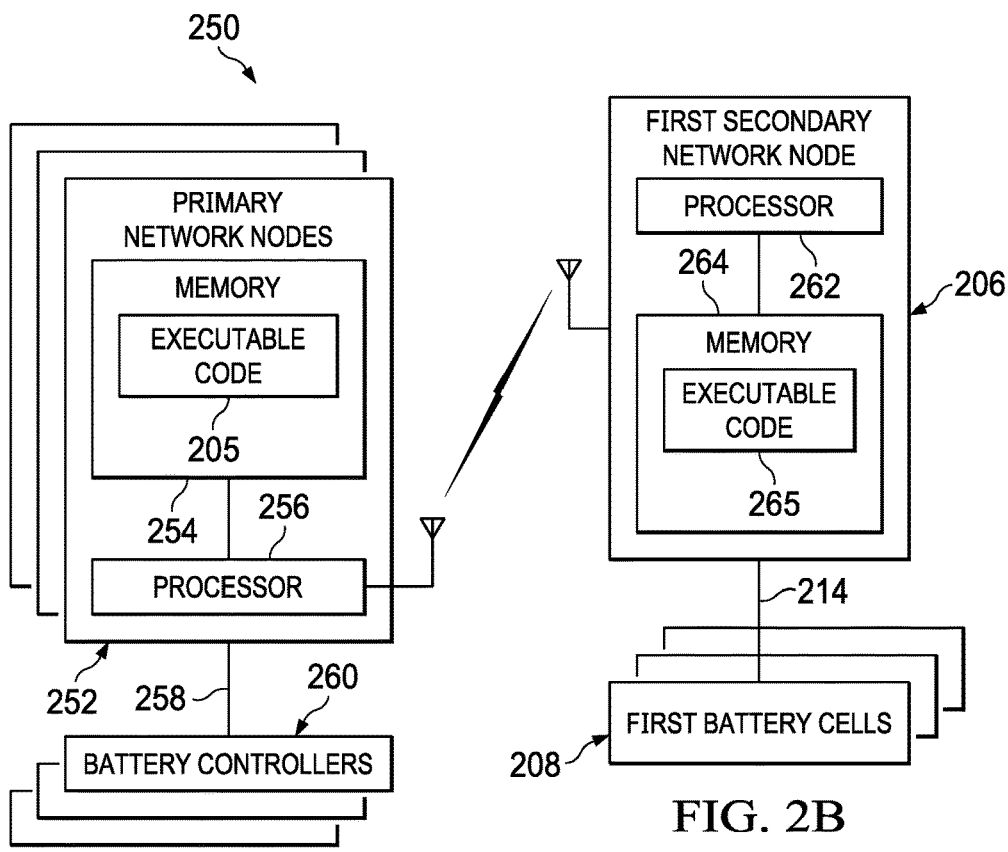
FIG. 2B is a block diagram of a wireless battery management system according to various examples.

FIG. 2B illustrates an example wireless battery management system 250. The wireless battery management system 250 is an example of the wireless battery management system 100 described above. As shown, the wireless battery management system 250 includes the first secondary network node 206, the first plurality of battery cells 208, a plurality of primary network nodes 252, a memory 254, a processor 256, a first wired connection 258, and a plurality of battery controllers 260. The plurality of primary network nodes 252 includes the memory 254 and the processor 256. In an example, a portion of the memory 254 may be non-transitory and a portion of the memory 254 may be transitory. In examples, the memory 254 includes executable code 255 which, when executed by the processor 256, causes the processor 256 to perform the actions attributed herein to the primary network node 252.

The plurality of primary network nodes 252 are coupled to the plurality of battery controllers 260 using the first wired connection 258 and are wirelessly coupled to the secondary network node 206. The first secondary network node 206 is coupled to the first plurality of battery cells 208 using the wired connection 214 and wirelessly coupled to the plurality of primary network nodes 252. As shown in FIG. 2A, the first secondary network node 206 may include a processor and memory (e.g., processor 262 and memory 264). FIG. 2B does not limit the number of secondary network nodes in the wireless battery management system 250. In an example, each of the plurality of primary network nodes 252 is wirelessly coupled to at least eight secondary network nodes. In an example, the first secondary network node 206 can be coupled to at least 16 battery cells using the fourth wired connection 216.

The wireless battery management system 250 manages the first plurality of battery cells 208 using the plurality of primary network nodes 252, the plurality of battery controllers 260, the memory 254, the processor 256, and the first secondary network node 206. Instructions in the memory 254 cause the processor 256 to instruct the plurality of primary network nodes 252 to wirelessly communicate with the first secondary network node 206 about the state of the first plurality of battery cells 208. The plurality of primary network nodes 252 and the first secondary network node 206 communicate using various protocol formats. For example, the plurality of primary network nodes 252 and the first secondary network node 206 use a DL protocol format and a UL protocol format, where each of the DL protocol format and the UL protocol format includes a frame control field to communicate battery management information. When the first plurality of battery cells 208 notify the first secondary network node 206 of a condition, the first secondary network node 206 communicates with the plurality of primary network nodes 252 that the condition is present. The plurality of primary network nodes 252 receives the notification of the condition from the first secondary network node 206 and alerts the plurality of battery controllers 260 of the condition. The plurality of battery controllers 260 determines a proper reaction to the condition and sends an instruction to the plurality of primary network nodes 252. The plurality of primary network nodes 252 transmits the instruction to the first secondary network node 206. The first secondary network node 206 receives the instruction to manage the first plurality of battery cells 208 in response to the condition of the first plurality of battery cells 208. The first secondary network node 206 manages the first plurality of battery cells 208 in response to the condition.

In an example, the first secondary network node 206 communicates with a first primary network node of the plurality of primary network nodes 252 based on instructions from a master controller (not shown). The first secondary network node 206 can transition communication from the first primary network node to a second primary network node of the plurality of primary network nodes 252. The first primary network node and the second primary network node communicate with each other to coordinate transferring the active connections of the first secondary network node 206 from the first primary network node to the second primary network node. In an example, the first primary network node communicates with the first secondary network node 206 and the second primary network node monitors a status of the first primary network node. The status can indicate whether the first primary network node has power and is operating within normal operating conditions. The first primary network node provides a clock signal to the second primary network node to synchronize communication. The first primary network node and the second primary network node select different frequencies to communicate with the first secondary network node 206. Selecting different frequencies allows the plurality of primary network nodes 252 to minimize interference when communicating to the first secondary network node 206. For example, if the first primary network node were to lose power, or if the status of the first primary network node were to fall out of normal operating conditions, then the second primary network node can connect to the first secondary network node 206 to supplement communication until the first primary network node can operate normally again.

Figure 3:
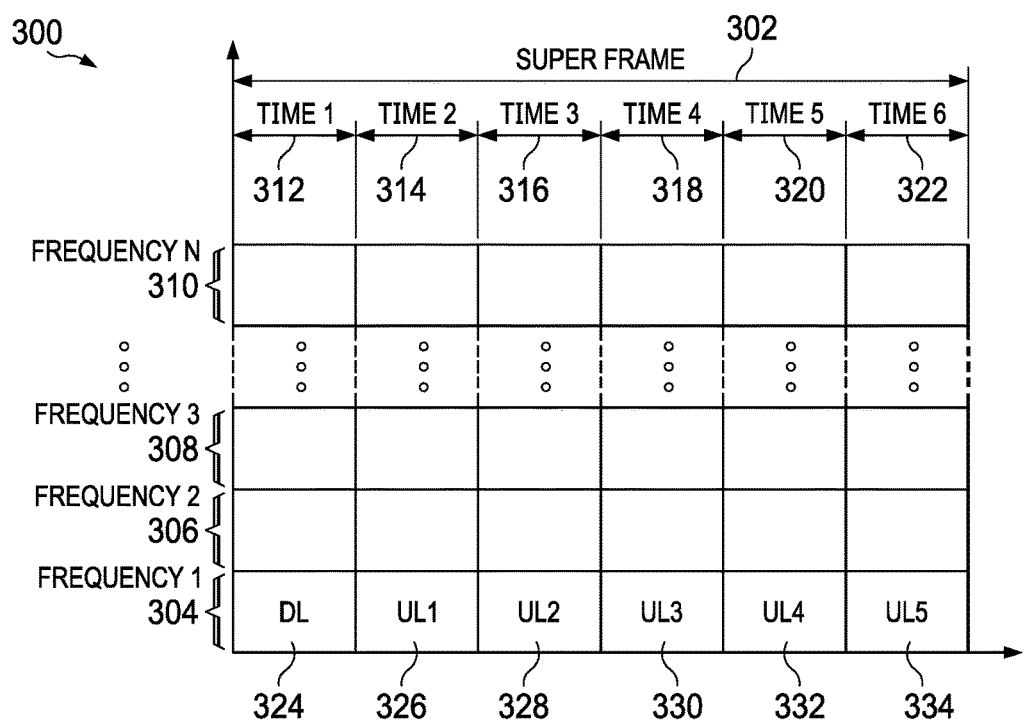
FIG. 3 is an illustration of a communication frame used by a wireless battery management system according to various examples.

FIG. 3 illustrates a communication frame 300 used by a wireless battery management system, e.g., the wireless battery management system 100. As shown, the communication frame 300 includes an SF 302, a first frequency 304, a second frequency 306, a third frequency 308, and an Nth frequency 310, a first time frame 312, a second time frame 314, a third time frame 316, a fourth time frame 318, a fifth time frame 320, a sixth time frame 322, a DL frame 324, a first UL frame 326, a second UL frame 328, a third UL frame 330, a fourth UL frame 332, and a fifth UL frame 334. Frequency is denoted by the y-axis and time is denoted by the x-axis. Each of the time frames 312, 314, 316, 318, 320, 322 is configurable based on the end application of the wireless battery management system. The frames 312, 314, 316, 318, 320, 322 may be referred to herein as slots 312, 314, 316, 318, 320, 322, respectively.

The communication frame 300 is used by a wireless battery management system to communicate battery management information between the primary network node and the secondary network nodes. In an example, during the SF 302, the primary network node transmits the DL frame 324 on the first frequency 304 during the first time frame 312. During the first time frame 312, at least one of the secondary network nodes receives the DL frame 324. The DL frame 324 can be transmitted by the primary network node in a broadcast manner or transmitted by the primary network node in a unicast manner. A broadcast includes the primary network node transmitting the DL frame 324 to all of the secondary network nodes in a single time frame. A unicast includes the primary network node transmitting the DL frame 324 to one of the secondary network nodes during one time frame.

In an example, a broadcast is used by the primary network node to transmit the DL frame 324 to all of the secondary network nodes during the first time frame 312. A first secondary network node transmits the first UL frame 326 on the first frequency 304 during the second time frame 314 in response to receiving the DL frame 324 from the primary network node. A second secondary network node transmits the second UL frame 328 on the first frequency 304 during the third time frame 316 in response to receiving the DL frame 324 from the primary network node. A third secondary network node transmits the third UL frame 330 on the first frequency 304 during the fourth time frame 318 in response to receiving the DL frame 324 from the primary network node. A fourth secondary network node transmits the fourth UL frame 332 on the first frequency 304 during the fifth time frame 320 in response to receiving the DL frame 324 from the primary network node. A fifth secondary network node transmits the fifth UL frame 334 on the first frequency 304 during the sixth time frame 322 in response to receiving the DL frame 324 from the primary network node. In this example, the SF 302 ends at the end of the sixth time frame 322.

In an example, a unicast is used by the primary network node to transmit the DL frame 324 to a first secondary network node on the first frequency 304 during the first time frame 312. During the first time frame 312, the first secondary network node receives the DL frame 324. The first secondary network node transmits the first UL frame 326 on the first frequency 304 during the second time frame 314 in response to receiving the DL frame 324. In an example where there is a single primary network node and a single secondary network node, the SF 302 ends at the end of the second time frame 314.

In an example, the primary network node and the secondary network nodes may communicate on one of the frequencies other than the first frequency 304, such as the second frequency 306, the third frequency 308, the Nth frequency 310, or the like. A change in the frequency used may be caused by the frequency hopping method in the foregoing discussion. In an example, a length of time of each of the time frames may be different or the same depending on an end application of the wireless battery management system. In an example, the secondary network nodes acknowledge receipt of the DL frame 324 using an acknowledgment code (ACK) and the primary network node acknowledges receipt of the UL frames 326, 328, 330, 332, 334 using an ACK. An ACK is a type of signal between a sender and recipient to acknowledge successful receipt of communication.

Figure 4A:
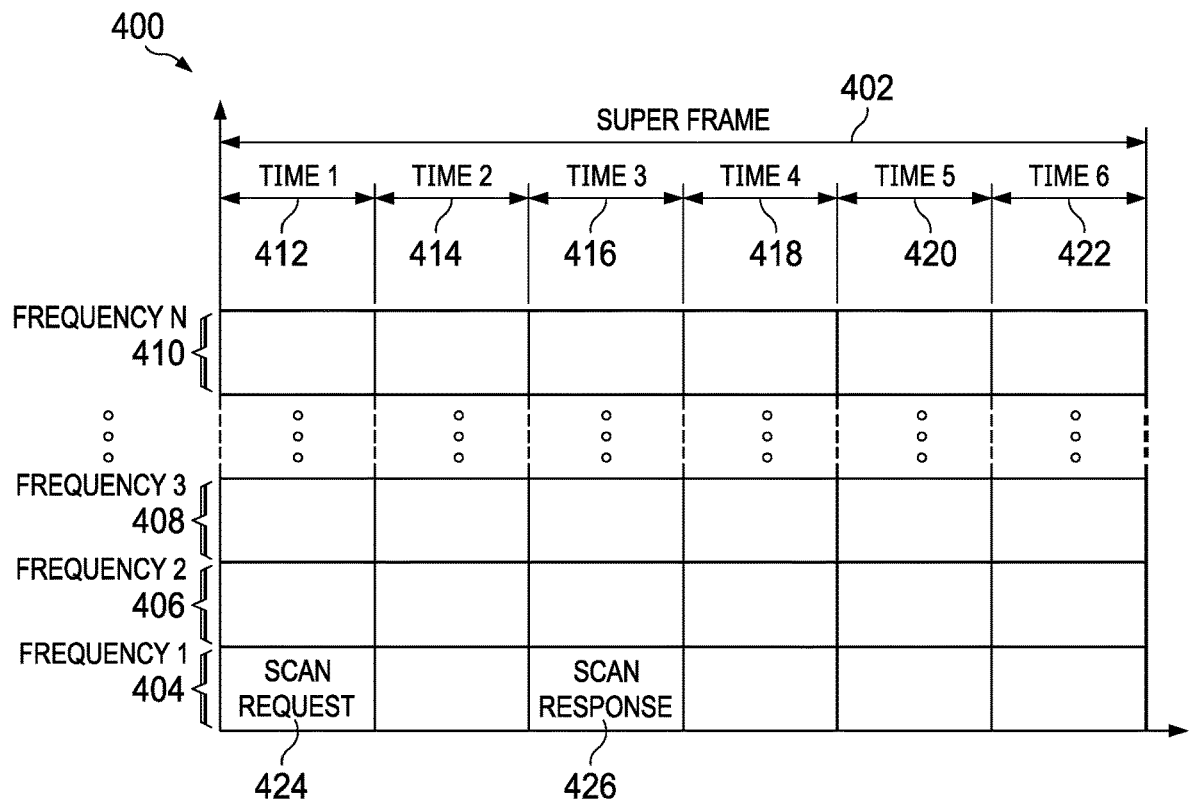
FIG. 4A is an illustration of a scan communication frame used by a wireless battery management system according to various examples.

FIG. 4A illustrates a scan communication frame 400 used by a wireless battery management system, e.g., the wireless battery management system 100. As shown, the scan communication frame 400 includes an SF 402, a first frequency 404, a second frequency 406, a third frequency 408, and an Nth frequency 410, a first time frame 412, a second time frame 414, a third time frame 416, a fourth time frame 418, a fifth time frame 420, a sixth time frame 422, a scan request frame 424, and a scan response frame 426. Frequency is denoted by the y-axis and time is denoted by the x-axis. And each of the frames is active for a predetermined time. The frames 412, 414, 416, 418, 420, 422 may be referred to herein as slots 412, 414, 416, 418, 420, 422, respectively.

The scan communication frame 400 is used by a wireless battery management system for the primary network node to scan for the secondary network nodes to establish communication. In an example, during the SF 402, the primary network node transmits the scan request frame 424 on the first frequency 404 during the first time frame 412 to the secondary network nodes. During the first time frame 412, the secondary network nodes receive the scan request frame 424. The scan request frame 424 includes information about the structure of the SF 402 and the frame formatting of the DL and UL slots, such as coordination information for communication, wakeup schedules for when the secondary network nodes sleep, and clock synchronization within the primary network node and secondary network nodes. The secondary network nodes transmit the scan response frame 426 to the primary network node on the first frequency 404 during the third time frame 416. The scan response frame 426 includes information indicating whether the secondary network nodes are unconnected from the primary network node and require pairing. Pairing, in this case, involves a procedure used by the primary network node and the secondary network nodes to establish a wireless connection and share security information.

In an example, the secondary network nodes that are unconnected from the primary network node respond to the scan request frame 424 with the scan response frame 426. A time frame (or slot frame) at which the secondary network nodes start transmitting the scan response frame 426 may be calculated as follows:

$$\text{SlotFrame}N = \text{SwitchInfo}N + \text{SumBytes}(\text{UniqueID}(i)) \mod(4 * nr\_of\_nodes)$$

where "SwitchInfoN" is the number of SFs in a SwitchInfo field of a protocol format, "UniqueID(i)" is an identifier of one of the secondary network nodes, and "nr_of_nodes" is the number of secondary nodes that are connected to the primary network node. The SwitchInfo field of the protocol format includes the SFs for communication between the primary network nodes and the secondary network nodes.

Figure 4B:
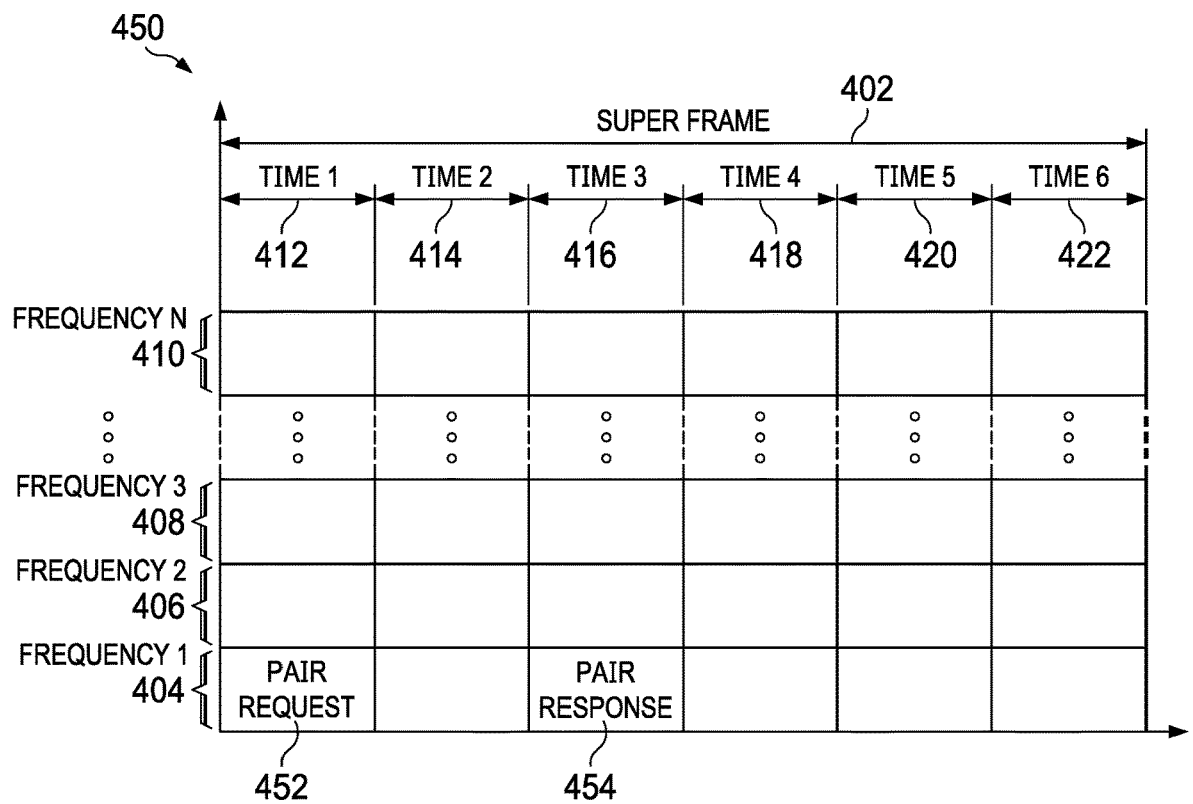
FIG. 4B is an illustration of a pairing communication frame used by a wireless battery management system according to various examples.

FIG. 4B illustrates a pairing communication frame 450 used by a wireless battery management system, e.g., the wireless battery management system 100. As shown, the pairing communication frame 450 includes an SF 402, a first frequency 404, a second frequency 406, a third frequency 408, and an Nth frequency 410, a first time frame 412, a second time frame 414, a third time frame 416, a fourth time frame 418, a fifth time frame 420, a sixth time frame 422, a pair request frame 452, and a pair response frame 454. Frequency is denoted by the y-axis and time is denoted by the x-axis. Each of the frames is active for a predetermined time.

The pairing communication frame 450 is used by a wireless battery management system to pair the primary network node and the secondary network nodes to establish communication. In an example, during the SF 402, the primary network node transmits the pair request frame 452 on the first frequency 404 during the first time frame 412 to one of the secondary network nodes that is unconnected to the primary network node. The pair request frame 452 includes connection parameters for the secondary network nodes that are unconnected to the primary network node such as time frames to be used for UL/DL, channel hopping information, and security information. After the secondary network node receives the pair request frame 452, the secondary network node responds with the pair response frame 454. The pair response frame 454 indicates successful pairing between the primary network node and the secondary network nodes.

In an example, the primary network node transmits the pair request frame 452 to more than one of the secondary network nodes. If the primary network node transmits the pair request frame 452 to more than one of the secondary network nodes, then there will be purposeful delays in pairing between the primary network node and the secondary network nodes. The delays in pairing will be to ensure network timing between the primary network node and the secondary network nodes is consistent across the secondary network nodes. The delays between pairing gives the primary network node enough time to establish communication with each of the secondary network nodes. Having the network timing consistent across the secondary network nodes allows synchronous communication between the primary network node and the secondary network nodes.

Figure 5:
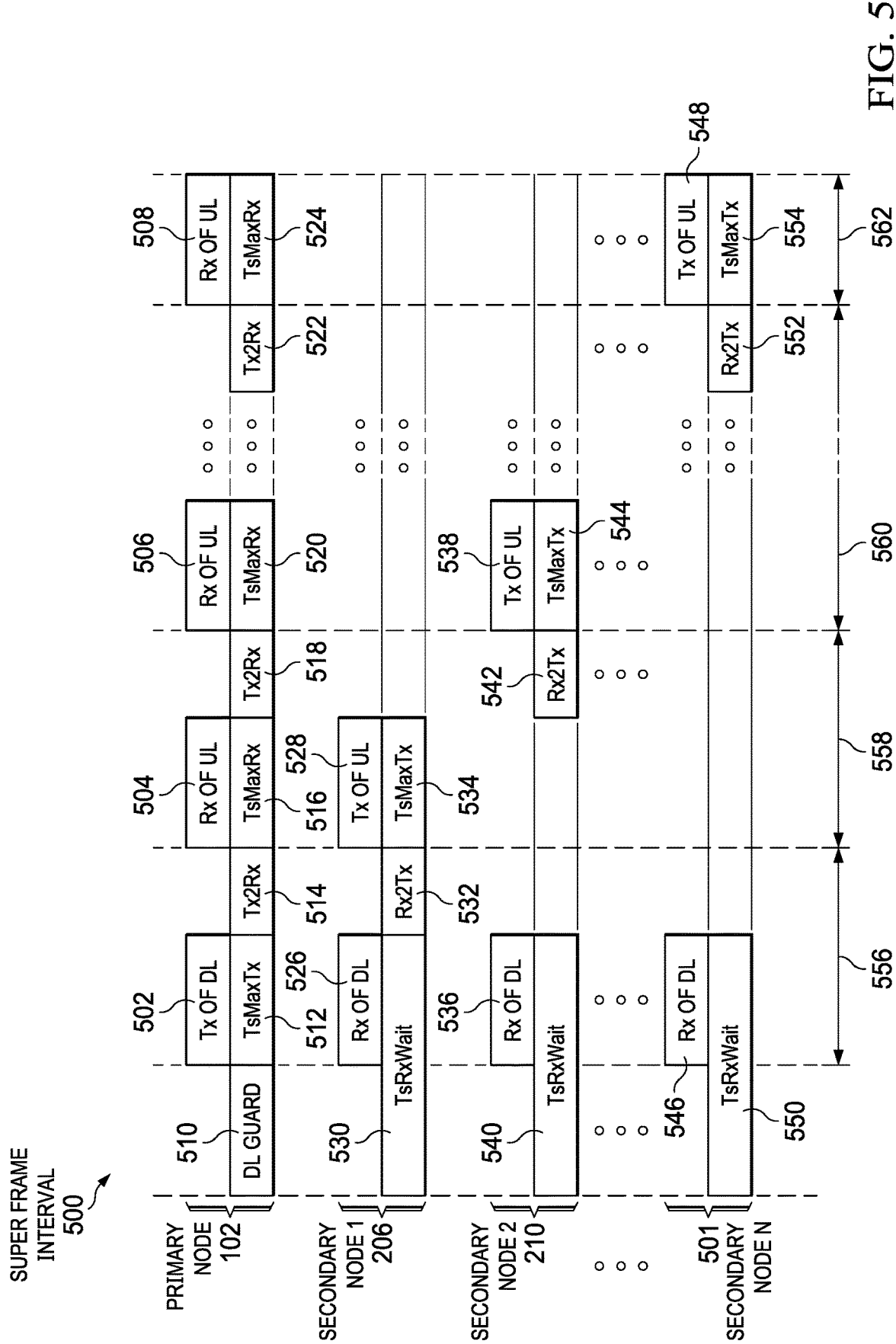
FIG. 5 is an illustration of a super frame interval used by a wireless battery management system according to various examples.

FIG. 5 illustrates an example super frame interval 500 used by a wireless battery management system, e.g., the wireless battery management system 100. The primary network node 102 communicates with the first secondary network node 206, the second secondary network node 210, and an Nth secondary network node 501 using, for example, the super frame interval 500. As shown, the super frame interval 500 includes a DL transmit frame 502, a first UL receive frame 504, a second UL receive frame 506, a third UL receive frame 508, a DL guard frame 510, a DL transmit time frame 512, a first transmit to receive frame 514, a first UL receive time frame 516, a second transmit to receive frame 518, a second UL receive time frame 520, a third transmit to receive frame 522, a third UL receive time frame 524, a first DL receive frame 526, a first UL transmit frame 528, a first receive wait time 530, a first receive to transmit frame 532, a first UL transmit time frame 534, a second DL receive frame 536, a second UL transmit frame 538, a second receive wait time 540, a second receive to transmit frame 542, a second UL transmit time frame 544, a third DL receive frame 546, a third UL transmit frame 548, a third receive wait time 550, a third receive to transmit frame 552, a third UL transmit time frame 554, a first frame 556, a second frame 558, a third frame 560, and a fourth frame 562. The frames 556, 558, 560, and 562 may be referred to herein as slots 556, 558, 560, and 562, respectively.

The super frame interval 500 is used by a wireless battery management system to organize communication between the primary network node 102 and the secondary network nodes 106 for wireless battery management purposes. In an example, the super frame interval 500 is a medium access control (MAC) for data exchange between the primary network node 102 and the first secondary network node 206, the second secondary network node 210, and the Nth secondary network node 501. Each of the secondary network nodes 206, 210, 501 in the super frame interval 500 communicates with the primary network node 102 during a time slot as discussed with reference to FIG. 3. The primary network node 102 identifies which secondary network nodes 206, 210, 501 to communicate with based on an availability of the secondary network nodes 206, 210, 501. The availability of the secondary network nodes 206, 210, 501 is determined by a scanning process as described with reference to FIG. 4A. The time slot for the secondary network nodes 206, 210, 501 to communicate with the primary network node 102 is assigned when the primary network node 102 and the secondary network nodes 206, 210, 501 are paired as described with reference to FIG. 4B.

In an example, the super frame interval 500 starts with the DL guard frame 510. The DL guard frame 510 is a time period used to ensure there is no interference between subsequent SFs. At the time of the DL guard frame 510, the first secondary network node 206 enters the first receive wait time 530, the second secondary network node 210 enters the second receive wait time 540, and the Nth secondary network node 501 enters the third receive wait time 550.

In the first frame 556 of the super frame interval 500, after the DL guard frame 510, the primary network node 102 transmits the DL using the DL transmit frame 502 during the DL transmit time frame 512 to all of the secondary network nodes 206, 210, 501. In an example, the first frame 556 is the first time frame 312 as discussed with respect to FIG. 3. The first secondary network node 206 receives the DL using the first DL receive frame 526, the second secondary network node 210 receives the DL using the second DL receive frame 536, and the Nth secondary network node 501 receives the DL using the third DL receive frame 546. After the DL transmit frame 502, the primary network node 102 enters the first transmit to receive frame 514 in preparation to receive the ULs from each of the secondary network nodes 206, 210, 501. At the same time as the primary network node 102 enters the first transmit to receive frame 514, the first secondary network node 206 enters the first receive to transmit frame 532 in preparation to transmit a first UL to the primary network node 102.

In the second frame 558 of the super frame interval 500, the first secondary network node 206 transmits the first UL using the first UL transmit frame 528 and during the first UL transmit time frame 534. In an example, the second frame 558 is the second time frame 314 as discussed with respect to FIG. 3. The primary network node 102 receives the first UL using the first UL receive frame 504 and during the first UL receive time frame 516. In the second frame 558, the primary network node 102 enters the second transmit to receive frame 518 in preparation to receive a second UL from the second secondary network node 210. And the second secondary network node 210 enters the second receive to transmit frame 542 in preparation to transmit a second UL to the primary network node 102.

In the third frame 560 of the super frame interval 500, the second secondary network node 210 transmits the second UL using the second UL transmit frame 538 and during the second UL transmit time frame 544. In an example, the third frame 560 is the third time frame 316 as discussed with respect to FIG. 3. The primary network node 102 receives the second UL using the second UL receive frame 506 and during the second UL receive time frame 520. In the third frame 560, the primary network node 102 enters the third transmit to receive frame 522 in preparation to receive a third UL from the Nth secondary network node 501. And the Nth secondary network node 501 enters the third receive to transmit frame 552 in preparation to transmit a third UL to the primary network node 102.

In the fourth frame 562 of the super frame interval 500, the Nth secondary network node 501 transmits the third UL using the third UL transmit frame 548 and during the third UL transmit time frame 554. In an example, the fourth frame 562 is the sixth time frame 322 as discussed with respect to FIG. 3. The primary network node 102 receives the third UL using the third UL receive frame 508 and during the third UL receive time frame 524.

In an example, the super frame interval 500 lacks any ACK packets, rather, acknowledgement information is within the DL frame and in the UL frames. Keeping the acknowledgement information within the DL frame and the UL frames allows for enhanced efficiency (throughput) while reducing latency for data transmissions. In an example, any of the UL transmit frames 528, 538, 548 can be retransmitted by the secondary network nodes 206, 210, 501 based on an ACK from the primary network node 102 for one of the frames of the super frame interval 500. In an example, the DL transmit frame 502 can be retransmitted by the primary network node 102 based on ACK information from the secondary network nodes 206, 210, 501.

In an example, the transmissions of each of the frames of the super frame interval 500 can be at the same frequency or at different frequencies. If the transmissions are at different frequencies, the change in frequency is based on a hopping sequence for the communication of the primary network node 102 and the secondary network nodes 206, 210, 501.

Figure 6:
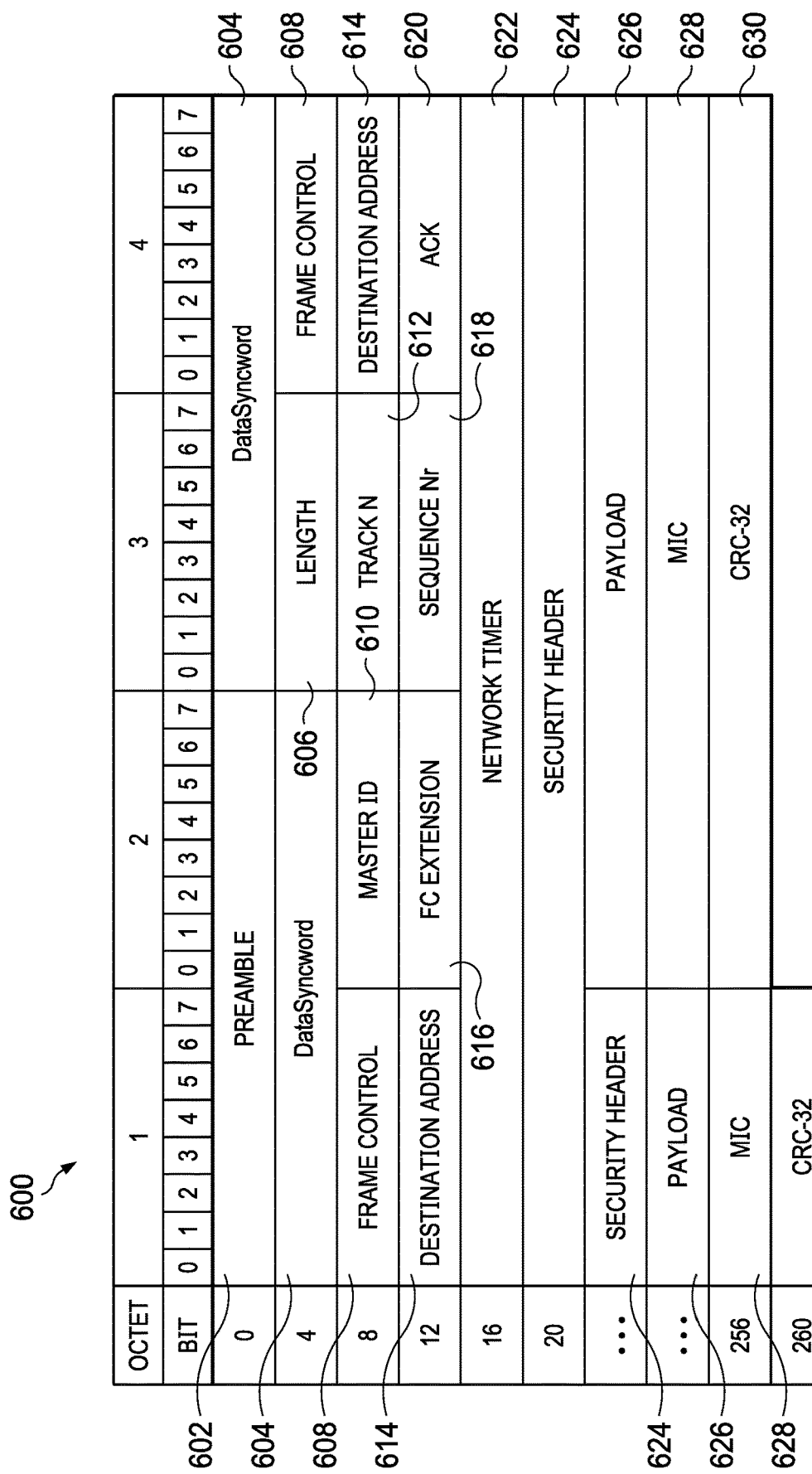
FIG. 6 is an illustration of a downlink protocol format used by a wireless battery management system according to various examples.

FIG. 6 illustrates a DL protocol format 600 used by a wireless battery management system, e.g., the wireless battery management system 100. The top row of the DL protocol format 600 labeled as "Octet" represents the octet identifier to assist in describing the format of the DL protocol format 600. In the DL protocol format 600 there are four octets in the protocol representation, each octet with eight bits. The second row of the DL protocol format 600 labeled as "Bit" identifies the bit number of each of the octets to assist in describing the format of the DL protocol format 600. The numbers on the far left of the DL protocol format 600 represent the number of octets prior to the immediate row. For example, the fourth row of the DL protocol format 600 indicates that four octets precede the subsequent octets. As shown, the DL protocol format 600 includes a preamble 602, a data sync word 604, a length field 606, a frame control 608, a master ID 610, a track N frame 612, a destination address (destination addr) frame 614, a frame control extension (FC extension) 616, a sequence number (sequence nr) 618, an ACK 620, a network timer 622, a security header 624, a payload 626, a message integrity code (MIC) field 628, and a 32-bit cyclic redundancy check (CRC-32) 630. The DL protocol format 600 is an example of a DL protocol format and additional fields and/or format types that may be used for a wireless battery management system protocol to accommodate different features.

The DL protocol format 600 is used by a wireless battery management system to wirelessly communicate battery management information. For example, the DL protocol format 600 may be used by the primary network node to instruct the secondary network nodes to pair with the primary network node for battery management purposes. In another example, the DL protocol format 600 may be used in a DL frame as discussed with respect to FIG. 3, after the primary network node scans a network as discussed with respect to FIG. 4A and pairs with the secondary network nodes as discussed with respect to FIG. 4B.

In an example, the preamble 602 and the data sync word 604 are used by the primary network node and the secondary network nodes to detect the beginning of a frame of a data packet being transmitted between the primary network node and the secondary network nodes. The preamble 602 is used to synchronize a data transmission between the primary network node and the secondary network nodes by indicating a start of header information of a data frame, the end of the header information, and the start of a data payload. Here, the data frame is in reference to the entire frame of the DL protocol format 600. The data sync word 604 is used for synchronizing data and configuration channels between the primary network node and the secondary network nodes. The data sync word 604 includes a configuration code that specifies a frequency channel for the primary network node and each of the secondary network nodes to communicate. The length field 606 indicates the length of the data frame. The frame control 608 includes information about the type of the packet being sent. In an example, the type of the packet may be a scan request, a scan response, a pairing request, a pairing response, or the like.

In an example, the master ID 610 is the identifier for the primary network node that the secondary network nodes use to identify the primary network node. The track N frame 612 identifies which transceiver of the primary network node is communicating with the secondary network nodes. The destination address frame 614 indicates the destination address of a recipient of the communication. For example, when communication is in a broadcast manner, each of the secondary network nodes has the same destination address such that the destination address frame 614 applies to all of the secondary network nodes. The frame control extension 616 indicates whether, and by how much, the frame control 608 is extended. The sequence number 618 indicates whether the current data packet is part of an original transmission from the primary network node to the secondary network nodes or is part of a retransmission from the primary network node to the secondary network nodes. The ACK 620 indicates whether a transmission from the primary network node to the secondary network nodes is received. The ACK 620 is a single bit, which causes the secondary network node to set its own ACK to 1 when DL is successfully received (or to remain at 0 when unsuccessful). The network timer 622 indicates a common time between the primary network node and the secondary network nodes. The common time is a time signal shared between the primary network node and the secondary network nodes to allow synchronized communication between the primary network node and the secondary network nodes. The network timer 622 is used to synchronize the secondary network nodes based on a timer of the primary network node.

In an example, the security header 624 includes a frame counter and a key refresh control field. The frame counter is an arbitrary number used once for the primary network node to establish cryptographic communication with the secondary network nodes. The key refresh control field is used to indicate, and complete, updating of the security keys that are exchanged between the primary network node and the secondary network nodes.

The payload 626 includes the data that is the actual intended message to be sent. For example, the payload 626 may include information regarding battery management from the primary network node to the secondary network node. The MIC field 628 is used to confirm the frame is from the stated sender (e.g., the authenticity of the frame) and has not been changed. The MIC field 628 protects data integrity of the frame, as well as its authenticity, by allowing the primary network node and the secondary network nodes to detect any changes to the content of the frame. The CRC-32 630 is used for error detection in the frame the payload 626 is encrypted. The CRC-32 630 detects accidental changes to raw data of the frame by comparing values based on a mathematical function performed on all or part of the content of the data frame, such as the remainder of polynomial division of contents of the data frame.

Figure 7:
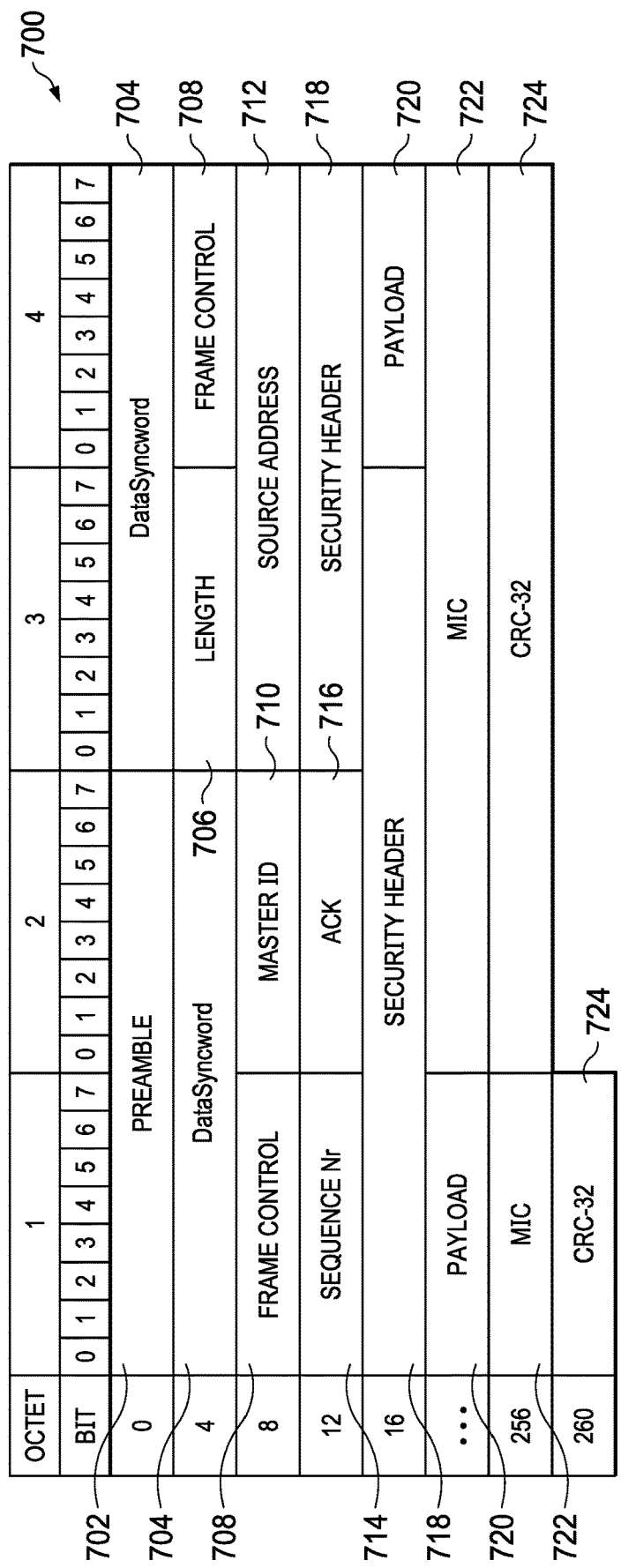
FIG. 7 is an illustration of an uplink protocol format used by a wireless battery management system according to various examples.

FIG. 7 illustrates a UL protocol format 700 used by a wireless battery management system, e.g., the wireless battery management system 100. The top row of the UL protocol format 700 labeled as "Octet" represents the octet identifier to assist in describing the format of the UL protocol format 700. In the UL protocol format 700 there are four octets in the protocol representation, each octet with eight bits. The second row of the UL protocol format 700 labeled as "Bit" identifies the bit number of each of the octets to assist in describing the format of the UL protocol format 700. The numbers on the far left of the UL protocol format 700 represent the number of octets prior to the immediate row. For example, the fourth row of the UL protocol format 700 indicates that four octets come before the subsequent octets. As shown, the UL protocol format 700 includes a preamble 702, a data sync word 704, a length field 706, a frame control 708, a master ID 710, a source address frame 712, a sequence number (sequence nr) 714, an ACK 716, a security header 718, a payload 720, a MIC field 722, and a CRC-32 724. The UL protocol format 700 is an example of a UL protocol format and additional fields and/or format types that may be used for a wireless battery management system protocol to accommodate different features.

The UL protocol format 700 is used by a wireless battery management system for the primary network node and the secondary network nodes to wirelessly communicate battery management information. For example, the UL protocol format 700 may be used by the primary network node to instruct the secondary network nodes to pair with the primary network node for battery management purposes. In another example, the UL protocol format 700 may be used in a UL frame as discussed with respect to FIG. 3, after the primary network node scans a network as discussed with respect to FIG. 4A and pairs with the secondary network nodes as discussed with respect to FIG. 4B.

In an example, the preamble 702 and the data sync word 704 are used by the primary network node and the secondary network nodes to detect the beginning of a frame of a data packet being transmitted between the secondary network nodes and the primary network node. The preamble 702 is used to synchronize a data transmission between the secondary network nodes and the primary network node by indicating a start of header information of a data frame, the end of the header information, and the start of a data payload. Here, the data frame is the entire frame of the UL protocol format 700. The data sync word 704 is used for synchronizing data and configuration channels between the secondary network nodes and the primary network node. The data sync word 704 includes a configuration code that specifies a frequency channel for each of the secondary network nodes and the primary network node to communicate. The length field 706 indicates the length of the data frame. The frame control 708 includes information about the type of the packet being sent. In an example, the type of the packet may be a scan request, a scan response, a pairing request, a pairing response, or the like.

In an example, the master ID 710 is the identifier for the primary network node that the secondary network nodes use to identify the primary network node. The source address frame 712 indicates an address assigned by the primary network node to the secondary network nodes. For example, when data is broadcast, each of the secondary network nodes transmits a UL to the primary network node from different source addresses such that the source address frame 712 is unique to each of the secondary network nodes. The sequence number 714 indicates whether the current data packet is part of an original transmission from the primary network node to the secondary network nodes or is part of a retransmission from the primary network node to the secondary network nodes. The ACK 716 indicates whether transmission from the primary network node to the secondary network nodes is received. The ACK 716 is a single bit, which is set to 1 when the DL from the primary network node is successfully received (or remains at 0 when unsuccessful).

In an example, the security header 718 includes a frame counter and a key refresh control field. The frame counter is an arbitrary number used once for the primary network node to establish cryptographic communication with the secondary network nodes. The key refresh control field is used to indicate, and complete, updating of the security keys that are exchanged between the primary network node and the secondary network nodes. The payload 720 includes the data that is the actual intended message to be sent. For example, the payload 720 may include information regarding battery cell health from the secondary network nodes to the primary network node. The MIC field 722 is used to confirm the frame is from the stated sender (its authenticity) and has not been changed. The MIC field 722 protects data integrity of the frame, as well as its authenticity, by allowing the primary network node and the secondary network nodes to detect any changes to the content of the frame. The CRC-32 724 is used for error detection in the frame the payload 720 is encrypted. The CRC-32 724 detects accidental changes to raw data of the frame by comparing values based on a mathematical function performed on all or part of the content of the data frame, such as the remainder of polynomial division of contents of the frame.

As described above, it may be beneficial for the primary network node 102 to determine the time at which a secondary network node, such as secondary network node 206, generated a given packet that is transmitted to the primary network node 102. Although the time of packet receipt by the primary network node 102 may be negatively influenced by wireless communications, the time of packet generation is not susceptible to such deleterious influences. Accordingly, the time of packet generation provides a more accurate perception of the behavior of the WBMS 100. The secondary network nodes 206, 210 may be configured to provide information to the primary network node 102 that is usable by the primary network node 102 to determine the time that a given packet was generated, as is now described.

Figure 8:
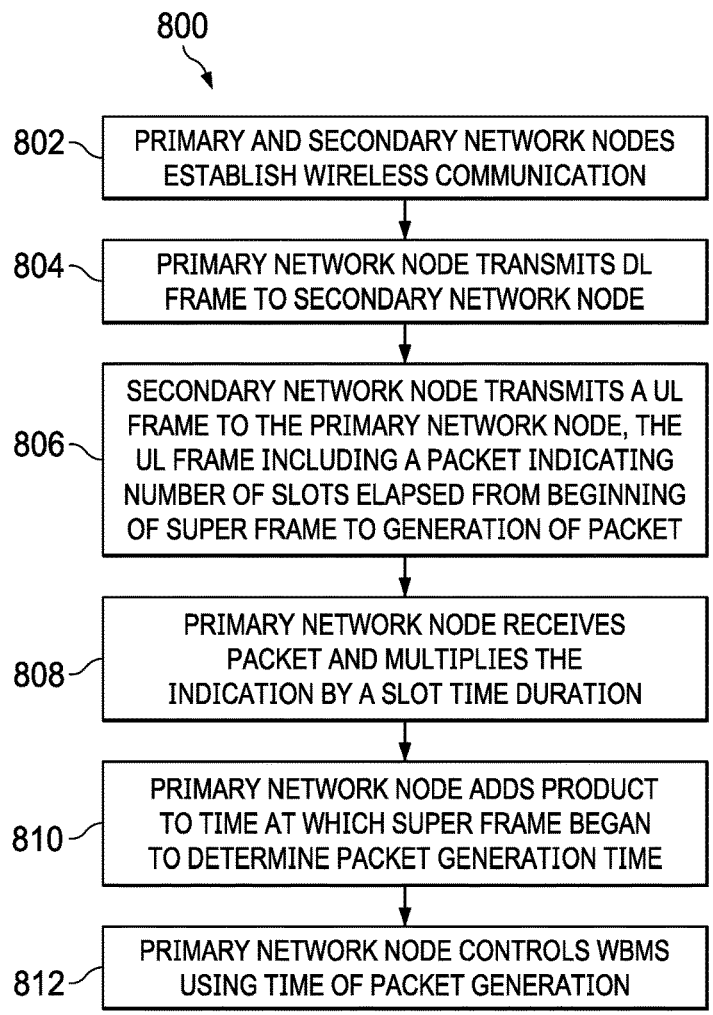
FIGS. 8-10 are flow diagrams of methods for determining super frame packet generation times using an additive technique according to various examples.

FIG. 8 is a flow diagram of a method 800 for determining the time at which a packet was generated. In particular, the method 800 may be performed by a primary network node, such as the primary network node 102, and by a secondary network node, such as secondary network node 206. The method 800 includes the primary network node 102 and the secondary network node 206 establishing wireless communication, for example, as described in detail above (802). The method 800 includes the primary network node 102 transmitting a DL frame, such as DL frame 324 (FIG. 3), to the secondary network node 206 as part of a SF 302 (804). For example, the DL frame 324 may be a request for the secondary network node 206 to provide data regarding the health of the battery cells 208 to which the secondary network node 206 is coupled. Responsive to receipt of the DL frame 324, the secondary network node 206 may transmit to the primary network node 102 a UL frame, such as the UL frame 334 (FIG. 3) (806). In some examples, the secondary network node 206 is configured to include in a packet of the UL frame 334 (e.g., as part of the payload, such as within a single byte of payload 720 in FIG. 7) an indication of the number of SF 302 slots that have elapsed from a start time of the SF 302 to the time at which the aforementioned packet is generated. For example, if the secondary network node 206 generated a packet for transmission during the UL frame 334, a total of five slots (DL frame 324, UL frame 326, UL frame 328, UL frame 330, and UL frame 332) have elapsed, and thus the secondary network node 206 indicates to the primary network node 102 in a packet containing battery cell health information (e.g., battery cell parameters, such as a voltage, a current, a temperature, an indication of a register setting in a battery monitor that is configured to monitor the set of battery cells, or a combination thereof) that that packet was generated five slots after the beginning time of the SF 302. As described above, the secondary network node 206 is synchronized with the primary network node 102 and the remaining secondary network nodes in the WBMS 100, and thus the secondary network node 206 is aware of the number of slots that have elapsed from the beginning of the SF 302 to the time at which the secondary network node 206 generated the packet.

Responsive to the receipt of a packet containing such information, the primary network node 102 multiplies the indication (e.g., five slots) by the time duration of each slot (which, in examples, is uniform) to produce a total time elapsed since the beginning of the SF 302 (808). For example, if the indication is n slots and each slot has t duration, the primary network node 102 determines the product of n and t. The primary network node 102 adds the total time elapsed to the time at which the SF 302 began to determine the time at which the packet from the secondary network node 206 was generated (810). Possession of the actual generation time of the packet from the secondary network node 206, as opposed to the time at which the packet was received at the primary network node 102, is useful to the WBMS 100, as described above. The primary network node 102 may use the time of packet generation to control the WBMS 100 (812), for example, by issuing a battery cell balancing command.

In some examples, the secondary network node 206 transmits a number of super frame intervals that have elapsed since the beginning of the SF 302 in lieu of transmitting a number of slots that have elapsed since the beginning of the SF 302. In such examples, the primary network node 102 multiplies the number of super frame intervals by the duration of each super frame interval (which, in examples, is uniform) to produce a total time elapsed since the beginning of the SF 302. The primary network node 102 adds the total time elapsed to the time at which the SF 302 began to determine the time at which the packet from the secondary network node 206 was generated.

Figure 9:
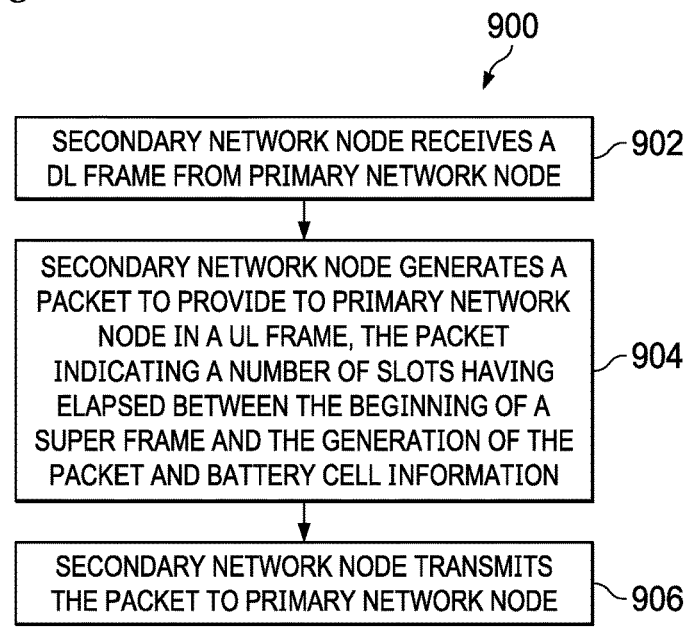

FIG. 9 is a flow diagram of a method 900 for determining the time at which a packet was generated. In particular, the method 900 may be performed by a secondary network node, such as secondary network node 206. The method 900 includes the secondary network node 206 receiving a DL frame from a primary network node, such as primary network node 102, as part of a SF, such as SF 302 (902). The method 900 includes the secondary network node 206 generating a packet to provide to the primary network node 102 in a UL frame (904). The method 900 includes the secondary network node 206 including in the packet an indication of a number of slots that have elapsed between the beginning of the SF 302 and the generation of the packet. The method 900 includes the secondary network node 206 including in the packet information about one or more battery cells to which the secondary network node 206 is coupled. The method 900 includes the secondary network node 206 transmitting the packet to the primary network node 102 for processing as described herein (906).

Figure 10:
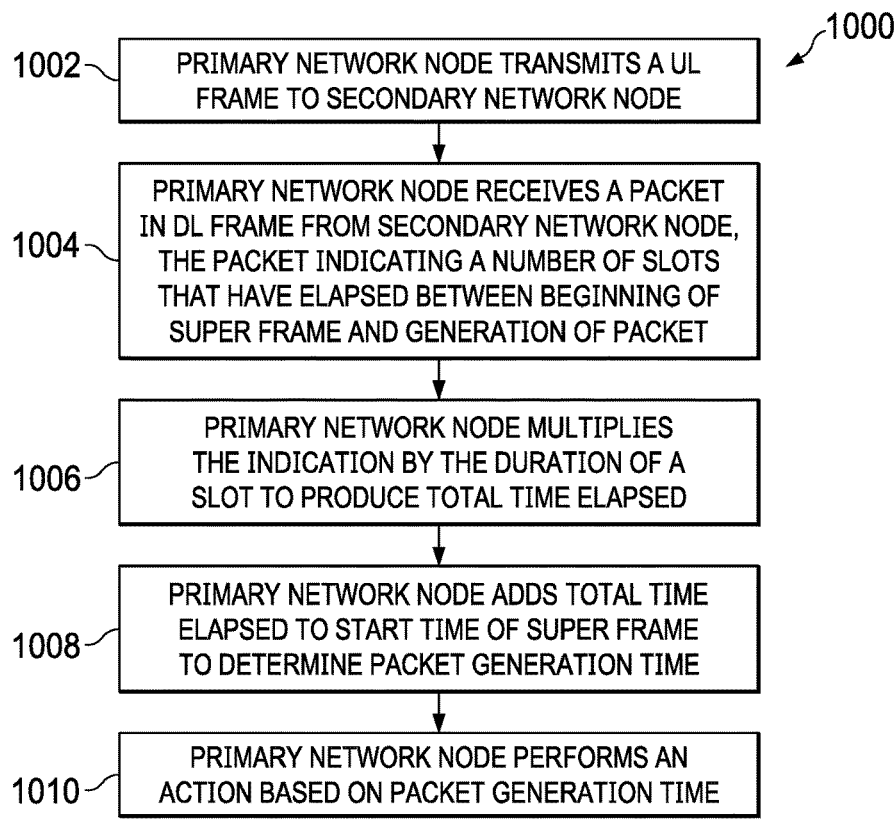

FIG. 10 is a flow diagram of a method 1000 for determining the time at which a packet was generated. In particular, the method 1000 may be performed by a primary network node, such as the primary network node 102. The method 1000 includes the primary network node 102 transmitting a UL frame to a secondary network node, such as secondary network node 206, as part of a SF 302 (1002). The method 1000 includes the primary network node 102 receiving a packet in a DL frame from the secondary network node 206 as part of the SF 302 (1004). The DL frame includes an indication as to the number of slots that have elapsed between the beginning of the SF 302 and the generation of the packet. The method 1000 includes the primary network node 102 multiplying the indication by the duration of a slot to produce a total time elapsed from the beginning of the SF 302 to the generation of the packet received from the secondary network node 206 (1006). The method 1000 includes the primary network node 102 adding the total time elapsed to the start time of the SF 302 to produce a time at which the packet received from the secondary network node 206 was generated (1008). The method 1000 may include the primary network node 102 performing an action based on the time at which the packet was generated, such as performing battery cell balancing (1010).

As described above, the total time elapsed from the beginning of a super frame may be added to the start time of the super frame to determine a time at which the packet received from the secondary network node was generated. However, in some examples, a subtractive technique may be used to determine the time of packet generation. Specifically, in such examples, the secondary network node 206 determines a number of slots elapsed between the time the secondary network node 206 generated the packet and the time the secondary network node 206 is to transmit the packet, and the secondary network node 206 includes an indication of this number of slots in the packet. The primary network node 102 receives the indication and multiplies the indication by the duration of each slot (which, in examples, is uniform) to produce a total time elapsed between the time the packet was generated by the secondary network node 206 and the time the packet was transmitted by the secondary network node 206. The primary network node 102 subtracts the total time elapsed from the current time (the time at which the packet is received by the primary network node 102) to determine the time at which the secondary network node 206 generated the packet. This technique is now described with reference to FIGS. 11-13.

Figure 11:
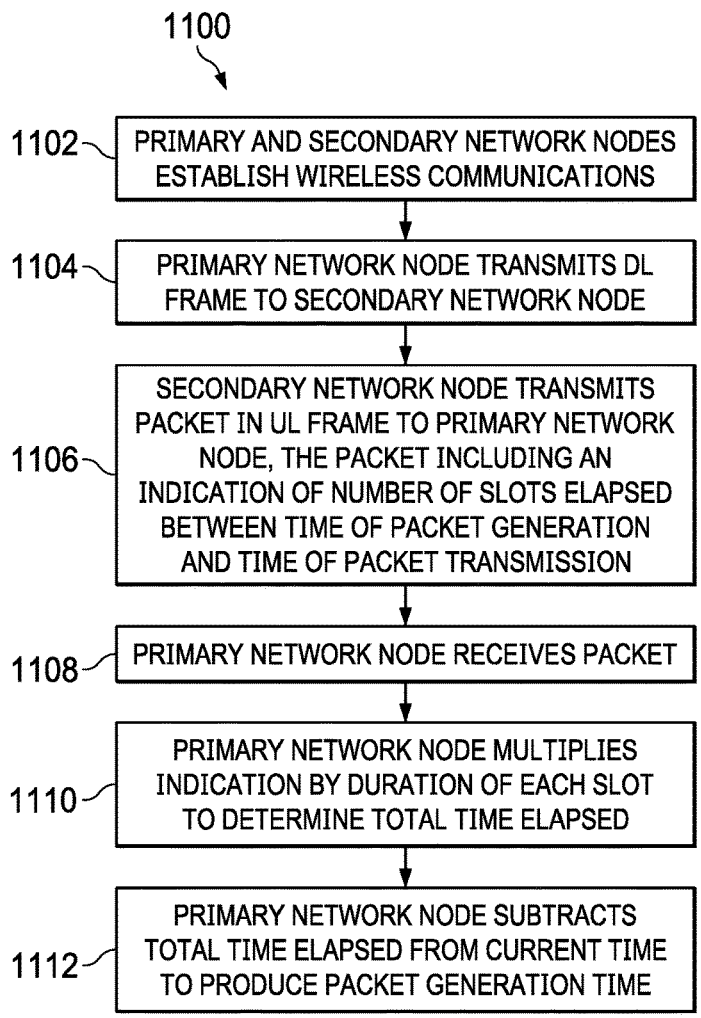

FIG. 11 is a flow diagram of a method 1100 for determining the time at which a packet was generated. In particular, the method 1100 may be performed by a primary network node, such as the primary network node 102, and by a secondary network node, such as secondary network node 206. The method 1100 includes the primary network node 102 and the secondary network node 206 establishing wireless communication, for example, as described in detail above (1102). The method 1100 includes the primary network node 102 transmitting a DL frame, such as DL frame 324 (FIG. 3), to the secondary network node 206 as part of a SF 302 (1104). For example, the DL frame 324 may be a request for the secondary network node 206 to provide data regarding the health of the battery cells 208 to which the secondary network node 206 is coupled. Responsive to receipt of the DL frame 324, the secondary network node 206 may transmit to the primary network node 102 a UL frame, such as the UL frame 334 (FIG. 3), containing such battery cell health information (e.g., a parameter such as a voltage, a current, a temperature, an indication of a register setting in a battery monitor that is configured to monitor the set of battery cells, or a combination thereof) (1106). In some examples, the secondary network node 206 is configured to include in the UL frame 334 (e.g., as part of the payload, such as within a single byte of payload 720 in FIG. 7) an indication of the number of slots that have elapsed from the time the packet was generated to the time the packet is transmitted (the time of transmission is already known a priori due to the slotted nature of the communication protocol). For example, the secondary network node 206 may modify the generated packet with such an indication. The method 1100 includes the primary network node 102 receiving the packet from the secondary network node 206 (1108), multiplying the indication of the number of slots having elapsed by the duration of each slots (which, in examples, is uniform) to produce a total time elapsed between packet generation and packet transmission by the secondary network node 206 (1110), and subtracting the total time elapsed from the current time (the time at which the packet is received by the primary network node 102) to determine a packet generation time (1112).

Figure 12:
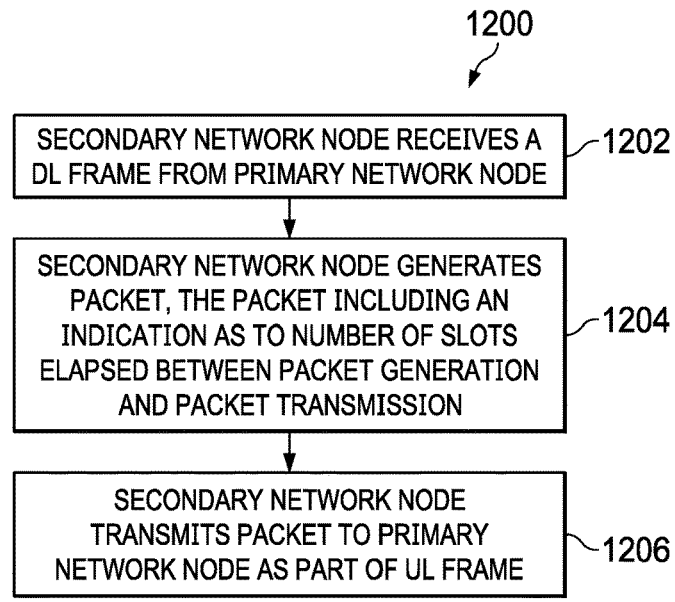

FIG. 12 is a flow diagram of a method 1200 for determining the time at which a packet was generated. In particular, the method 1200 may be performed by a secondary network node, such as secondary network node 206. The method 1200 includes the secondary network node receiving a DL frame of a SF 302 from a primary network node, such as primary network node 102 (1202). The method 1200 includes, responsive to the receipt of the DL frame, the secondary network node 206 generating a packet for transmission as part of a UL frame of the SF 302 (1204). The method 1202 comprises the secondary network node 206 including in the packet an indication as to the number of slots that have elapsed between the time the secondary network node 206 generated the packet to the time the secondary network node 206 transmitted the packet. For example, the secondary network node 206 may modify the generated packet with such an indication. The method 1202 includes the secondary network node 206 transmitting the packet to the primary network node 102 as part of a UL frame (1206).

Figure 13:
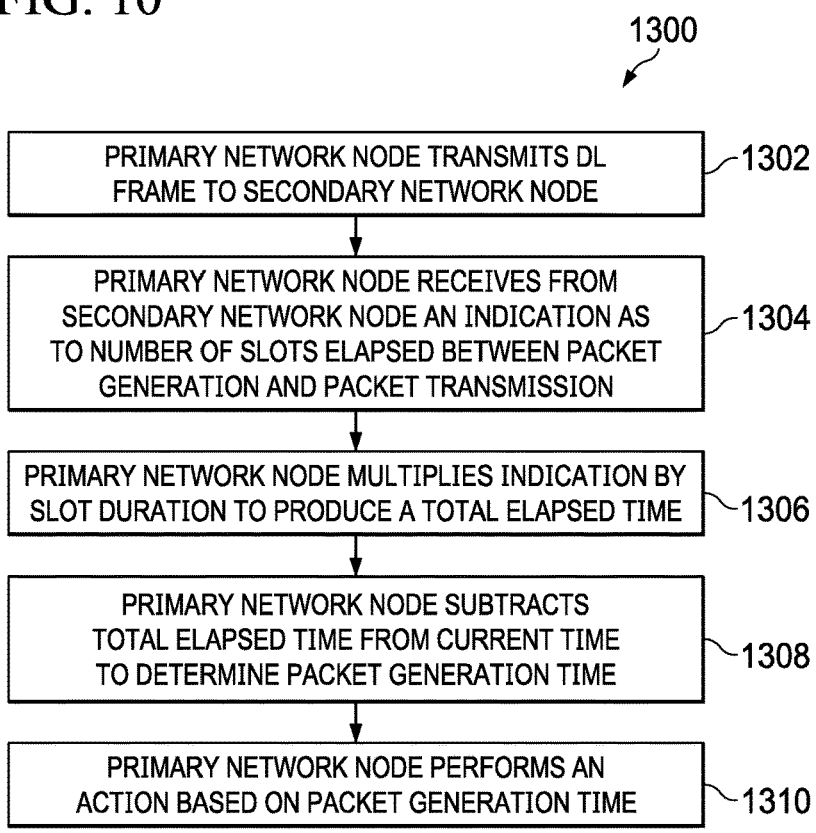
FIGS. 11-13 are flow diagrams of methods for determining super frame packet generation times using a subtractive technique, in accordance with various examples.

FIG. 13 is a flow diagram of a method 1300 for determining the time at which a packet was generated. In particular, the method 1300 may be performed by a primary network node, such as the primary network node 102. The method 1300 includes the primary network node 102 transmitting a DL frame of a SF 302 to a secondary network node, such as the secondary network node 206 (1302). The DL frame may include a request for information pertaining to battery cells that are coupled to the secondary network node 206. The method 1300 includes the primary network node 102 receiving from the secondary network node 206 an indication as to the number of SF 302 slots that have elapsed between the time a packet was generated and the time the packet was transmitted to the primary network node 102 as part of a UL frame of the SF 302 (1304). The method 1300 includes the primary network node 102 multiplying the indication of the number of elapsed SF 302 slots by the duration of each (which, in examples, is uniform) to produce a total elapsed time between the time the packet was generated by the secondary network node 206 and the time the packet was transmitted by the secondary network node 206 (1306). The method 1300 includes the primary network node 102 subtracting the total elapsed time from a current time (the time at which the primary network node 102 receives the packet from the secondary network node 206) to determine a time at which the secondary network node 206 generated the packet (1308). The method 1300 includes the primary network node 102 performing an action based on the time at which the packet was generated, such as performing battery cell balancing (1310).

The term "couple" is used throughout the specification. The term may cover connections, communications, or signal paths that enable a functional relationship consistent with this description. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

Unless otherwise stated, "about," "approximately," or "substantially" preceding a value means+/−10 percent of the stated value. Modifications are possible in the described examples, and other examples are possible within the scope of the claims.

What is claimed is:

1. A vehicular battery management system (BMS), comprising:
    a set of battery cells; and
    a secondary network node coupled to the set of battery cells, the secondary network node configured to:
        measure a parameter in the set of battery cells;
        generate a packet containing the parameter and an indication, generated by the secondary network node, indicating a number of super frame slots that have elapsed from a start time of a super frame to the generation of the packet; and
        wirelessly transmit the packet within the super frame to a primary network node,
        wherein the primary network node is configured to wirelessly receive the packet and to determine a time at which the secondary network node generated the packet based on the indication, a time duration of each slot in the super frame, and the start time of the super frame.
2. The BMS of claim 1, wherein the indication is contained within a single byte of the packet.
3. The BMS of claim 1, wherein the primary network node is configured to control the set of battery cells based on the determination.
4. The BMS of claim 1, wherein the primary network node is configured to determine the time at which the secondary network node generated the packet by adding a product of the indication and the time duration to the start time of the super frame.
5. The BMS of claim 1, wherein the parameter is a voltage, a current, a temperature, or a combination thereof.
6. The BMS of claim 1, wherein the parameter includes an indication of a register setting in a battery monitor that is configured to monitor the set of battery cells.
7. A method, comprising:
    wirelessly transmitting a first packet in a super frame to a node coupled to a set of battery cells;
    responsive to the transmission, wirelessly receiving from the node a second packet that includes an indication generated by the node and which indicates a number of super frame slots that have elapsed from a start time of the super frame to a time at which the second packet was generated;
    calculating the time at which the second packet was generated using the start time of the super frame and the number of super frame slots that have elapsed from the start time of the super frame; and
    controlling operation of the battery cells based on the calculation.
8. The method of claim 7, wherein calculating the time at which the second packet was generated includes using a time duration of each of the super frame slots.
9. The method of claim 8, wherein calculating the time at which the second packet was generated includes adding a product of the time duration and the number of super frame slots to the start time of the super frame.
10. The method of claim 7, wherein the second packet includes an indication of a parameter of the set of battery cells.
11. The method of claim 10, wherein the parameter is a voltage, a current, a temperature, or a combination thereof.
12. The method of claim 7, wherein the second packet includes an indication of a register setting in a battery monitor that is configured to monitor the set of battery cells.
13. The method of claim 7, wherein controlling operation of the battery cells includes transmitting a battery cell balancing command.
14. The method of claim 7, wherein the indication of the number of super frame slots is contained within a single byte of the second packet.
15. A computer-readable medium storing executable code, which, when executed by a controller, causes the controller to:
    process a packed received from a node in a super frame, the packet including an indication generated by the node and which indicates a number of super frame slots that have elapsed from a start time of the super frame to a time at which the packet was generated;
    determine the time at which the packet was generated by adding a product of the number of super frame slots and a time duration of each of the super frame slots to the start time of the super frame; and
    control operation of a battery cell based on the determination.
16. The computer-readable medium of claim 15, wherein the indication of the number of super frame slots is contained within a single byte of the packet.
17. The computer-readable medium of claim 15, wherein the packet includes an indication of a parameter of the battery cell.
18. The computer-readable medium of claim 17, wherein the parameter is a voltage, a current, a temperature, or a combination thereof.
19. The computer-readable medium of claim 15, wherein, to control operation of the battery cell, the executable code causes the controller to transmit a cell balancing command.

20. A vehicular battery management system (BMS), comprising:
- a set of battery cells; and
- a secondary network node coupled to the set of battery cells, the secondary network node configured to:
  - measure a parameter in the set of battery cells;
  - generate a packet containing the parameter;
  - generate an indication of a number of super frame slots between the generation and a transmission of the packet;
  - modify the packet to include the indication; and
  - wirelessly transmit the packet within the super frame to a primary network node,
  - wherein the primary network node is configured to wirelessly receive the packet and to determine a time at which the secondary network node generated the packet based on a current time, the indication, and a time duration of each slot in the super frame.

21. The BMS of claim 20, wherein the indication is contained within a single byte of the packet.

22. The BMS of claim 20, wherein the primary network node is configured to determine the time at which the secondary network node generated the packet by subtracting a product of the indication and the time duration from the current time.

* * * * *